(12) United States Patent
Ito et al.

(10) Patent No.: US 6,259,611 B1
(45) Date of Patent: Jul. 10, 2001

(54) PWM POWER CONVERTER

(75) Inventors: Junichi Ito; Shinichi Ishii; Hidetoshi Umida, all of Tokyo (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 09/409,999

(22) Filed: Sep. 30, 1999

(30) Foreign Application Priority Data

Oct. 1, 1998 (JP) .................................................. 10-279223

(51) Int. Cl.[7] ...................................................... H02M 1/12
(52) U.S. Cl. .............................................................. 363/41
(58) Field of Search ...................... 363/40, 41, 43, 363/124, 131; 376/238; 332/109

(56) References Cited

U.S. PATENT DOCUMENTS 5,736,825 * 4/1998 Kaura et al. ........................ 363/41 X
5,914,984 * 6/1999 Di Guardo et al. ................. 375/238

OTHER PUBLICATIONS

"5.2.3 PWM Control", pp. 727–728 Electrical Engineering Handbook, Feb. 28, 1987 by I.E.E.J.

"Theory and Design of AC Servo System", pp. 47–53, Aug. 10, 1991 by Sougou Electronics Publishing Co. Ltd.

* cited by examiner

Primary Examiner—Jessica Han
(74) Attorney, Agent, or Firm—Rossi & Associates

(57) ABSTRACT

A PWM power converter is provided which includes an adder that adds a high-frequency signal from a high-frequency generator to a voltage command signal, and a PWM generator of carrier comparison type or space vector type that generates a PWM signal based on the output of the adder, which PWM signal is used for driving switching devices to provide a desired output voltage.

8 Claims, 4 Drawing Sheets

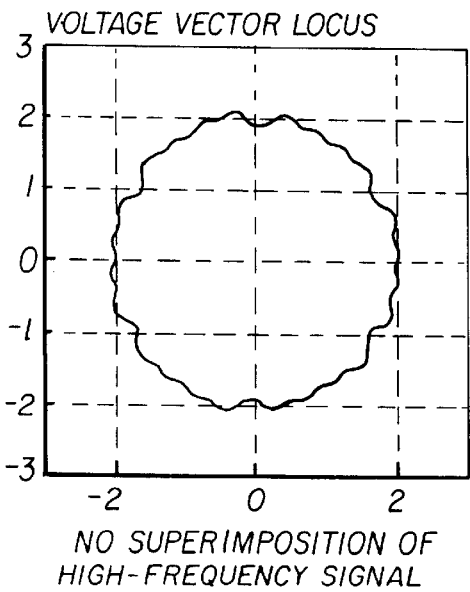
FIG. 5a
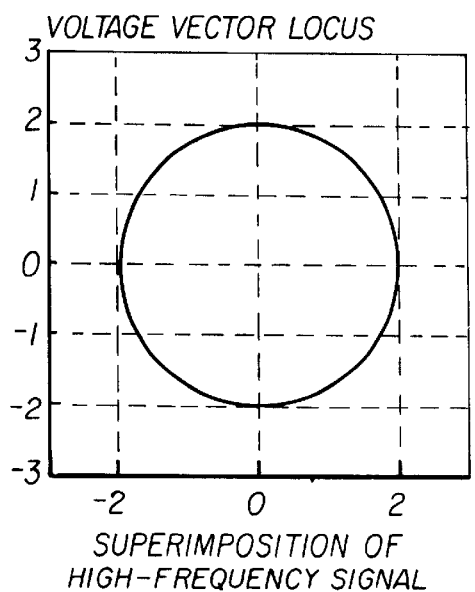
FIG. 5b
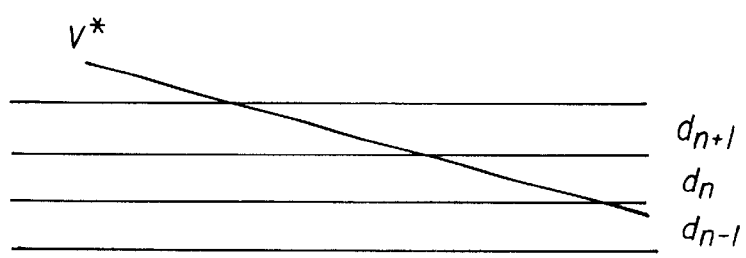
FIG. 6a
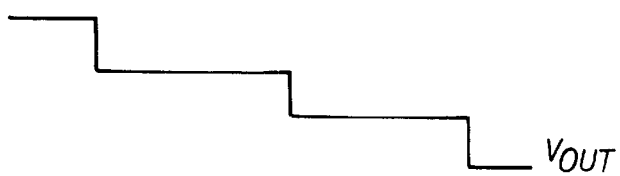
FIG. 6.b

PWM POWER CONVERTER

FIELD OF THE INVENTION

The present invention relates to a PWM power converter employing a pulse width modulation (PWM) method, which converter is constructed using switching devices, and provides a desired output voltage by controlling the ON duration and OFF duration of the switching devices. In particular, the present invention is concerned with such a PWM power converter that includes a PWM signal generating portion consisting of a digital hardware, and is able to generate a low output voltage with reduced ripple or errors in the output voltage.

BACKGROUND OF THE INVENTION

In power converters, a PWM method has been widely used as a control method for obtaining a desired output voltage. The PWM method is a method of turning on switching devices for a time interval or duration proportional to a voltage command, and may be of a carrier comparison method or a space vector method as widely known in the art. The carrier comparison method may be used for controlling a general power converter with pulse with modulation, in which a desired pulse width is obtained by comparing a carrier signal with a voltage command value. The space vector method may be used for generating polyphase ac through a power converter such as an inverter, in which the ON duration of the switchg devices per unit time is determined based on a space vector representing voltage or magnetic flux.

The carrier comparison method, which is widely known in the art, is described, for example, at "5.2.3 PWM CONTROL" on pp 727–728 in "Electrical Engineering Handbook" published on Feb. 28, 1987 by I.E.E.J. The space vector method, which is also widely known, is described on pp 47–53 of "Theory and Design of AC Servo System" published on Aug. 19, 1991 by Sougou Electronics Publishing Co. Ltd. The details of these methods will not be describe herein.

With recent developments in the digital technology, digital hardware has been increasingly used in a PWM portion for the purpose of reducing the cost. In the digital hardware of the carrier comparison type, for example, instantaneous values of a voltage command signal and a carrier signal are treated as discrete values, and the carrier waveform and voltage command waveform are subjected to D-A (digital-to-analog) conversion, to provide stepped waveforms when displayed in an analog format. Here, the size (value) of one step, when expressed in terms of the output voltage, will be called "PWM resolution".

FIG. 6 shows the waveform of output voltage $V_{out}$ within one period of carrier signal when the resolution is $d_n$, wherein the output voltage $V_{out}$ changes in steps for every value of $d_n$. As the step size $d_n$ decreases, quantization errors occurring when obtaining discrete values can be accordingly reduced.

A carrier signal having a desired carrier frequency can be obtained, for example, by changing the number of counting a CPU clock with an updown counter. Where the carrier frequency is to be increased, the number of counting is reduced, and, consequently, the PWM resolution is reduced with a result of an increase in quantization errors. If the step size $d_n$ is sufficiently small and the output voltage is sufficiently large, resulting quantization errors are insignificant or trivial. Where a low output voltage is to be generated, particularly during low-speed rotation of a motor, voltage errors in the output voltage are increased, thus causing torque ripple or nonuniform rotation.

FIG. 7 shows a known technique of reducing errors in the output voltage.

In order to reduce errors in the output voltage, output voltage detecting means 12 detects the output voltage, and the detected voltage and a command value for the output voltage are fed to a voltage regulator (AVR) 11 so as to correct a command value for generating PWM pulses, thereby to provide a desired output voltage. Here, the PWM method is of a carrier comparison type in which a carrier generating means 5 and a comparator 6 are used.

The use of feedback control as shown in FIG. 7 in order to reduce quantization errors results in an increase in the cost due to the provision of a sensor portion including the voltage detecting means. In particular, the voltage detecting means needs to be insulated from a main circuit, and thus requires an expensive insulating amplifier, with a result of a significant increase in the cost. Also, an expensive CPU is needed in the method in which the resolution $d_n$ is reduced by increasing the frequency of the CPU clock.

SUMMARY OF THE INVENTION

It is therefore an object of the present invention to provide a PWM converter that operates under open-loop control without utilizing voltage feedback control, so as to provide a desired voltage at a reduced cost even when the output voltage is relatively low.

To accomplish the above object, the present invention provides a PWM power converter wherein a high-frequency signal is superimposed on a first command signal so that a second command signal is generated, the high-frequency signal having a higher frequency than the first command signal, and wherein a pulse width modulating means as a hardware is provided for digitally performing pulse width modulation (PWM) so as to provide desired output voltage, the pulse width modulating means generating PWM pulses based on the second command signal.

According to a second aspect of the present invention, a PWM power converter is provided wherein a high-frequency signal is superimposed on a first carrier signal so that a second carrier signal is generated, the high-frequency signal having a higher frequency than a command signal, and wherein pulse width modulating means as a hardware is provided for digitally performing pulse width modulation (PWM) so as to provide desired output voltage, the pulse width modulating means generating PWM pulses by comparing the command signal with the second carrier signal.

According to a third aspect of the present invention, a PWM polyphase power converter is provided wherein a high-frequency signal is superposed on a first command signal corresponding to each phase of the power converter, so that a second command signal is generated, the high-frequency signal having a higher frequency than the first command signal, and wherein pulse width modulating means as a hardware is provided for digitally performing pulse width modulation (PWM) so as to provide desired output voltage, the pulse width modulating means generating PWM pulses for each phase by comparing the second command signal with a carrier signal.

According to a fourth aspect of the present invention, a PWM polyphase power converter is provided wherein a high-frequency signal having a higher frequency than a command signal is superimposed on a first carrier signal, so that a second carrier signal is generating, and wherein pulse width modulating means as a hardware is provided for digitally performing pulse width modulation (PWM) so as to provide desired output voltage, the pulse width modulating means generating PWM pulses for each phase of the power converter by comparing the command signal of the corresponding phase with the second carrier signal.

According to a fifth aspect of the present invention, a PWM polyphase power converter is provided wherein a high-frequency signal is superimposed on a first command signal of each phase as a zero-phase-sequence component thereof, so that a second command signal is generated, the high-frequency signal having a higher frequency than the first command signal, and wherein pulse width modulating means as a hardware is provided for digitally performing pulse width modulation (PWM) so as to provide desired output voltage, the pulse width modulating means generating PWM pulses for each phase by comparing the second command signal of the corresponding phase with a carrier signal.

In the PWM power converters constructed as described above, the high-frequency signal to be superimposed preferably has a period that is a multiple of that of the carrier signal. Also, the high-frequency signal to be superimposed is preferably in the form of a chopping wave. Furthermore, the high-frequency signal to be superimposed preferably has an amplitude that is not smaller than one-half of a resolution of the command signal or the carrier signal.

BRIEF DESCRIPTION OF THE DRAWINGS

The invention will be described in greater detail with reference to preferred embodiments thereof and the accompanying drawings, wherein:

FIGS. 5($a$) and 5($b$) are views showing voltage vector loci that are compared with each other;

FIGS. 6($a$) and 6($b$) are views useful in explaining an example of waveform of output voltage generated by a known power converter.

DESCRIPTION OF THE PREFERRED EMBODIMENTS

Figure 1:
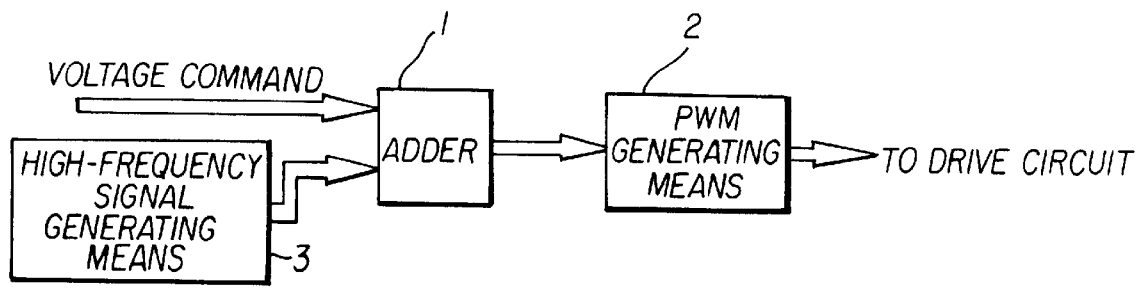
FIG. 1 is a block diagram showing a PWM power converter according to the first embodiment of the present invention.

FIG. 1 is a block diagram showing a PWM power converter constructed according to the first embodiment of the present invention.

The power converter of the present embodiment consists of an adder 1, PWM pulse generating means 2, high-frequency signal generating means 3, and other components. The adder 1 adds a high-frequency signal received from the high-frequency signal generating means 3, to a voltage command signal, and the PWM pulse generating means 2 generates PWM pulses, based on the voltage command signal to which the high-frequency signal has been added. The PWM pulse generating means 2 may be either of carrier comparison type or space vector type.

Figure 2A:
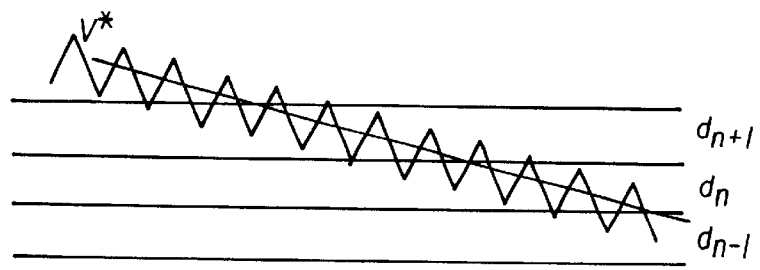
FIG. 2 is a view useful in explaining the principle of the operation of the power converter of FIG. 1.
Figure 2B:
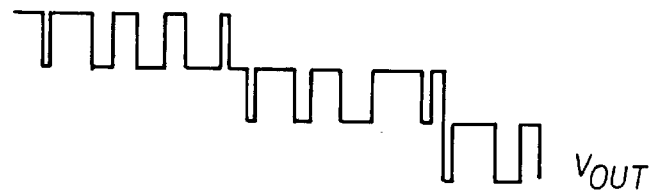

FIG. 2 is a view useful in explaining the principle of the operation of the power operation of FIG. 1.

In the known power converter as described above, the output voltage $v_{out}$ of the PWM generator does not change, i.e., is kept at a constant level while the command signal v* is within each of the intervals (=resolution) $d_{n-1}$, $d_n$, $d_{n+1}$, as shown in FIG. 6($a$). In the present embodiment, on the other hand, a high-frequency signal is superimposed on the voltage command signal v* so that the command signal v* varies four times per each interval $d_{n-1}$, $d_n$, $d_{n+1}$, as shown in FIG. 2($a$). Thus, the number of changes in the command signal is increased, thus quadrupling the resolution of the voltage command on the average, and thereby reducing quantization errors in the output voltage. FIG. 2($b$) shows the output voltage waveform $v_{out}$.

As shown in FIG. 2($a$), the high-frequency signal that is superimposed on the voltage command signal v* may be considered, if viewed from a different point, as a carrier signal used in carrier comparison type pulse width modulation. While the carrier signal of the carrier comparison type may be in the form of a sawtooth wave, sine wave, or a chopping wave, for example, it is apparent from the result of waveform analyses that higher harmonics are less likely to occur in the output voltage if a chopping wave is used. In the example of FIG. 2, too, the chopping wave is used as a high-frequency signal to be superimposed on the voltage signal, so that higher harmonics that occur due to the superimposed high-frequency signal can be minimized.

If the high-frequency signal is expected to enable pulse width modulation in each of the intervals $d_{n-1}$, $d_n$, $d_{n+1}$, the peak-to-peak amplitude of the high-frequency signal is determined to be equal to or large than the resolution of the carrier or command signal, in other words, the amplitude of the high-frequency signal is determined to be equal to or larger than one-half of the resolution of the carrier or command signal. In this case, a desired output voltage is obtained one time on the average per period of the high-frequency signal.

Further, the period of the high-frequency signal to be superimposed is selected to be a multiple of that of the carrier signal, so that high-frequency voltage that appears due to the superimposed high-frequency signal suppress beat that would otherwise occur in the output voltage.

Figure 3:
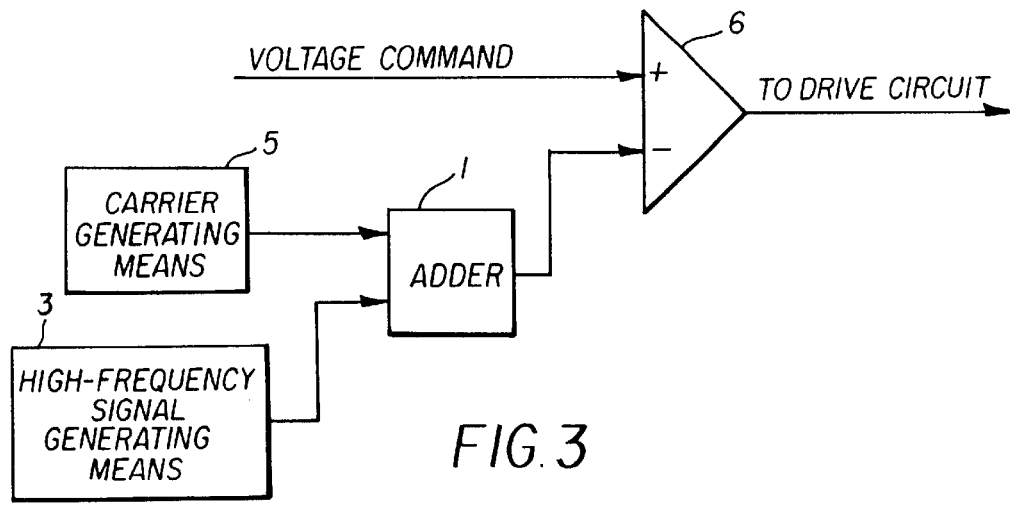
FIG. 3 is a block diagram showing the second embodiment of the present invention.

FIG. 3 is a block diagram showing the second embodiment of the present invention.

The PWM power converter of the present embodiment consists of an adder 1, high-frequency signal generating means 3, carrier generating means 5, comparator 6, and other components. The adder 1 receives respective outputs of the high-frequency signal generating means 3 and the carrier generating means 5.

In the present embodiment, the PWM pulse generating means is of carrier comparison type, and a high-frequency signal is superimposed on the carrier, so as to increase the average resolution of the voltage command.

Figure 4:
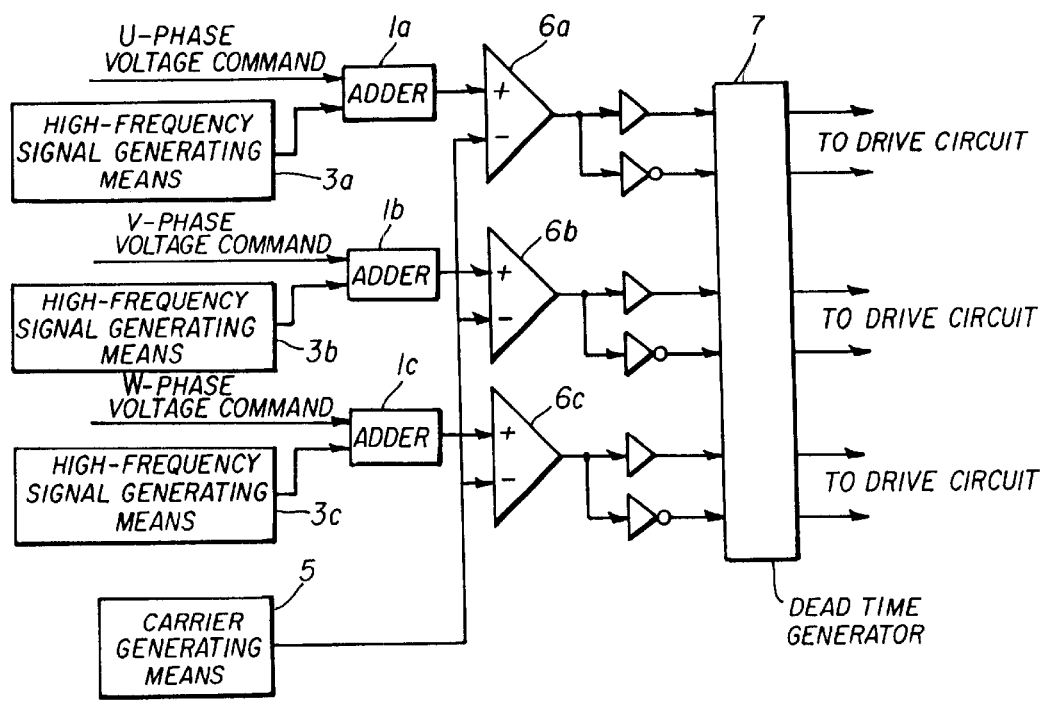
FIG. 4 is a block diagram showing the third embodiment of the present invention.
Figure 7:
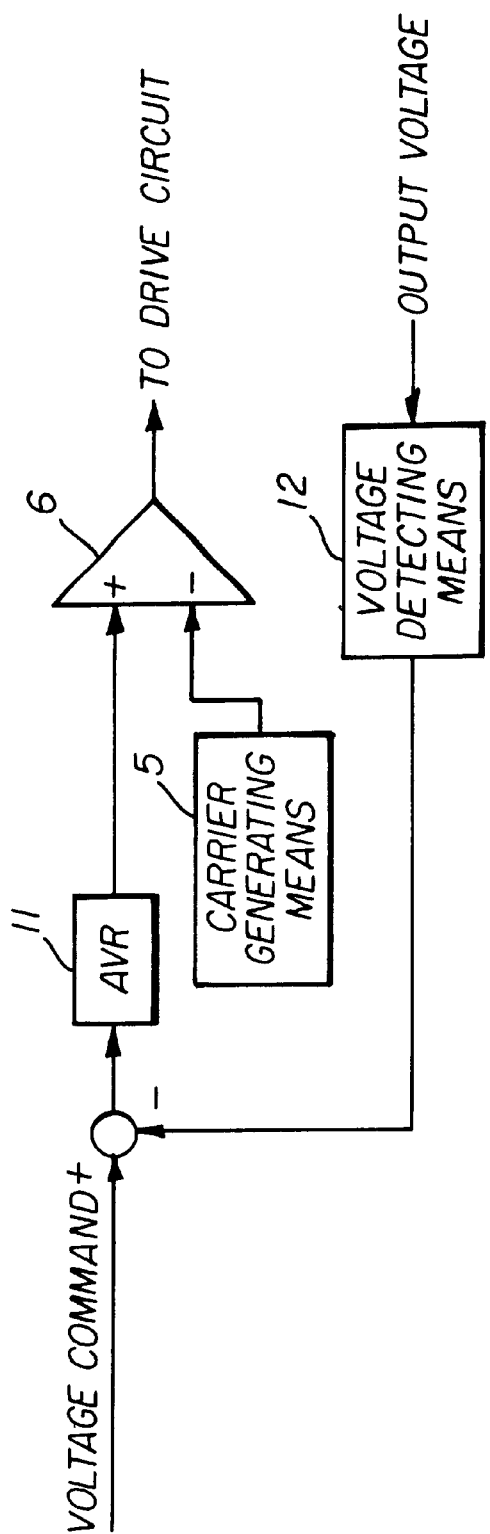
FIG. 7 is a block diagram showing a known example of power converter.

FIG. 4 is a block diagram showing the third embodiment of the present invention.

The present embodiment is in the form of a three-phase inverter, which includes adders 1$a$, 1$b$, 1$c$ for respective phases (U phase, V phase, and W phase), high-frequency signal generating means 3$a$, 3$b$, 3$c$, comparators 6$a$, 6$b$, 6$c$, and carrier generating means 5 that generates a common carrier signal to the comparators 6$a$, 6$b$, 6$c$. The PWM pulse generating means is of carrier comparison type in this embodiment, and a high-frequency signal is superimposed of a voltage command signal of each phase, so as to increase the numbers of changes in the command signal v*, thereby to increase the voltage resolution of the voltage command.

In the above operation, the high-frequency signal may be superimposed as a zero-phase-sequence component of the command signal of each phase, so that errors in the output voltage due to the superimposed high-frequency signal can be reduced. In the case where an electric motor is driven by the power converter, torque pulsation of the motor can be reduced. It is also possible to add the high-frequency signal to the carrier signal. In FIG. 4, reference numeral 7 denotes dead time generating means, which prevents switching devices on the upper and lower arms of each phase from turning on at the same time to be brought into the short-circuited state. The dead time generating means is not directly related to the present invention, and therefore will not described in detail.

FIG. 5(a) shows a voltage vector locus when the output voltage was 2% (with the rated voltage being 100%) and a high-frequency signal was not superimposed on a voltage command signal, while FIG. 5(b) and a voltage vector locus when the output voltage was 2% and a high-frequency signal was superimposed on the voltage signal. While distortion occurred in the case of FIG. 5(a) where the high-frequency signal was not superimposed, a locus having a circular shape was obtained with substantially no distortion in the case of FIG. 5(b) where the high-frequency signal was superimposed.

According to the present invention, even when the PWM generating means has a poor resolution, the resolution of a voltage command signal can be improved at a relatively low cost, without requiring feedback of a signal representing an output voltage detected by a sensor, thus enabling the power generator to provide a desired output voltage. Where the power converter is used for rotating a motor at a low speed, therefore, the motor can be smoothly driven at a relatively low cost, without suffering from non-uniform rotation.

What is claimed is:

1. A PWM power converter, comprising:

means for superimposing a high-frequency signal on a first command signal to generate a second command signal, said high-frequency signal having a high-frequency than said first command signal; and a pulse width modulating means as a hardware for digitally performing pulse width modulation (PWM) so as to provide desired output voltage, said pulse width modulating means generating PWM pulses based on said second command signal.

2. A PWM power converter, comprising:

means for superimposing a high-frequency signal on a first carrier signal to generate a second carrier signal, said high-frequency signal having a higher frequency than a command signal; and pulse width modulating means as a hardware for digitally performing pulse width modulation (PWM) so as to provide desired output voltage, said pulse width modulating means generating PWM pulses by comparing the command signal with the second carrier signal.

3. A PWM polyphase power converter, comprising:

means for superimposing a high-frequency signal on a first command signal corresponding to each phase of the power converter, to generate a second command signal, said high-frequency signal having a higher frequency than said first command signal;

pulse width modulating means as a hardware for digitally performing pulse width modulation (PWM) so as to provide desired output voltage, said pulse width modulating means generating PWM pulses for said each phase by comparing said second command signal with a carrier signal.

4. A PWM polyphase power converter comprising:

means for superimposing a high-frequency signal having a higher frequency than a command signal on a first carrier signal, thereby to generate a second carrier signal; and pulse width modulating means as a hardware for digitally performing pulse width modulation (PWM) so as to provide desired output voltage, said pulse width modulating means generating PWM pulses for each phase of the power converter by comparing the command signal corresponding to said each phase with said second carrier signal.

5. A PWM polyphase power converter, comprising:

means for superimposing a high-frequency signal on a first command signal of each phase as a zero-phase-sequence component thereof, thereby to generate a second command signal, said high-frequency signal having a higher frequency than the first command signal;

pulse width modulating means as a hardware for digitally performing pulse width modulation (PWM) so as to provide desired output voltage, said pulse width modulating means generating PWM pulses for each phase by comparing the second command signal corresponding to said each phase with a carrier signal.

6. A PWM power converter according to any one of claims 2–5, wherein said high-frequency signal has a period that is a multiple of that of the carrier signal.

7. A PWM power converter according to any one of claims 2–5, wherein said high-frequency signal comprises a chopping wave.

8. A PWM power converter according to any one of claims 2–5, wherein said high-frequency signal has an amplitude that is not smaller than one-half of a resolution of the command signal or the carrier signal.

* * * * *